No. 877,737. PATENTED JAN. 28, 1908.
T. A. ROBERTS.
BEET CHOPPER.
APPLICATION FILED APR. 26, 1907.

2 SHEETS—SHEET 1.

Witnesses
O. K. Reichenbach
John Bowers

Inventor
Thornton A. Roberts

By Chandler & Chandler
Attorneys

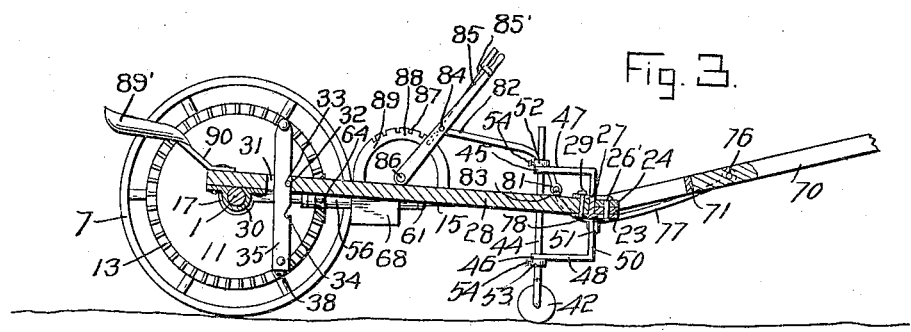
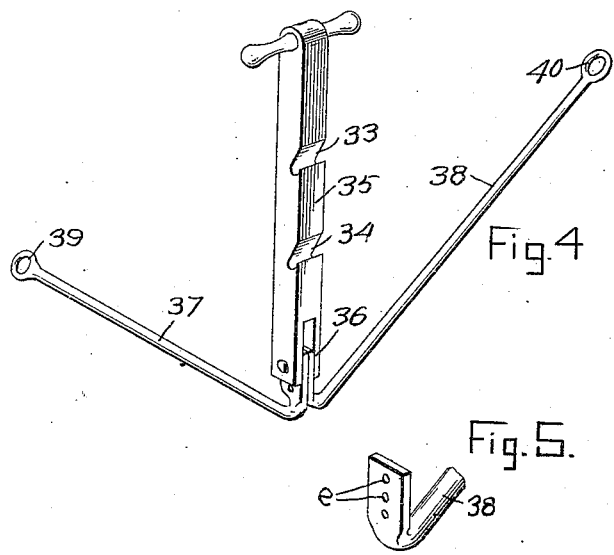

UNITED STATES PATENT OFFICE.

THORNTON A. ROBERTS, OF SUTHERLAND, NEBRASKA.

BEET-CHOPPER.

No. 877,737.  Specification of Letters Patent.  Patented Jan. 28, 1908.

Application filed April 26, 1907. Serial No. 370,452.

*To all whom it may concern:*

Be it known that I, THORNTON A. ROBERTS, a citizen of the United States, residing at Sutherland, in the county of Lincoln, State of Nebraska, have invented certain new and useful Improvements in Beet-Choppers; and I do hereby declare the following to be a full, clear, and exact description of the invention, such as will enable others skilled in the art to which it appertains to make and use the same.

This invention relates to beet choppers.

One object of the invention is to provide a machine of the character stated embodying such characteristics that its frame and adjunctive parts may be widened or narrowed as desired.

Another object of the invention resides in the construction and arrangement of mechanism for removing excess beets of such nature that the frame of the machine may be readily adjusted to cause an adjustment of the chopper blades.

A still further object of the invention resides in the provision of a machine of the character stated wherein it is operated by a continuously operating shaft or axle.

With these and other objects in view the present invention consists in the combination and arrangement of parts, as will be hereinafter more fully described, illustrated in the accompanying drawings, and particularly pointed out in the appended claims, it being understood that changes in the form, proportion, size and minor details may be made, within the scope of the claims, without departing from the spirit or sacrificing any of the advantages of the invention.

Figure 1:
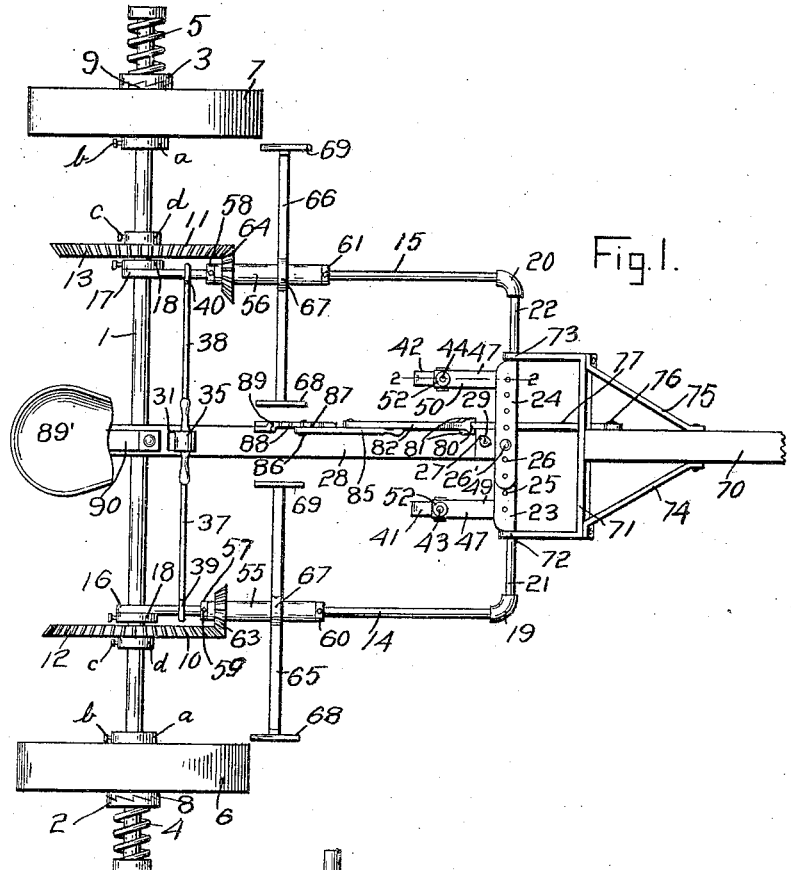
Figure 2:
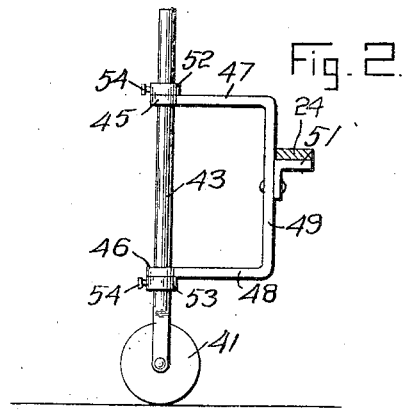

In the drawings: Figure 1 is a top plan view of the machine constructed in accordance with the present invention. Fig. 2 is a section on the line 2—2 of Fig. 1, parts being omitted for the sake of clearness of illustration. Fig. 3 is a central longitudinal section of the machine embodied in the present invention. Fig. 4 is a detailed perspective view of the rear adjusting lever and the arms associated therewith. Fig. 5 is a similar view illustrating the construction of the angular end portions of said arms.

Referring now to the drawings, the present invention comprises an axle 1 upon the opposite ends of which are slidably mounted the clutch sleeves 2 and 3, there being helical springs 4 and 5 arranged at the ends of the axle for coöperation with the respective clutch sleeves 2 and 3.

Mounted upon the axle 1 adjacent the said clutch sleeves 2 and 3 are ground wheels 6 and 7, each of which has its hub provided with clutch sleeves 8 and 9 for coöperation with the clutch sleeves 2 and 3 respectively. These ground wheels 6 and 7 are prevented from moving inwardly of the axle by means of the corresponding collars and set-screws $a$ and $b$ respectively and arranged adjacent the ground wheel and slidably secured to the said axle are the cog wheels 10 and 11, and each cog wheel being provided with teeth 12 and 13, upon its inner face for a purpose presently explained. It will be stated at this time that these cog wheels 10 and 11 may be adjusted upon the axle by manipulation of the set-screws $c$ of the collars $d$ which latter are integral with the cog wheels.

The main frame of the machine comprises two tubular members 14 and 15, each having its inner end provided with eyes 16 and 17 respectively, for pivotal engagement with the axle 1 adjacent the aforesaid cog wheels 12 and 13, there being spacing collars 18 between the eyes 16 and 17 of the corresponding frame members 14 and 15 and the said cog wheels for a purpose well understood. At the forward corners of the tubular members 14 and 15 are the elbow connections 19 and 20 with which are connected the short tubular members 21 and 22 the ends of which are flattened as at 23 and 24, and perforated as indicated by the reference characters 25 and 26. These flattened portions 23 and 24 of the frame are designed to overlap each other whereby the forward end of the frame may be adjusted to broader or narrower widths as may be desired through the instrumentality of suitable bolts 26' designed to engage interchangeably in registering perforations 25 and 26 of the flattened portions 23 and 24 at the forward end of the frame.

Secured in any suitable manner to the rear face of the flattened portion 24 of the frame is a shoulder 27 with which is connected the forward end of the beam 28, the connection between the beam and the said shoulder being effected by means of a suitable bolt 29. The rear end of the beam 28 is secured directly over the axle 1 by means of a U-shaped clamping element 30, which latter engages the axle loosely so as not to interfere with the rotation of the latter. The beam 28 is provided with a slot 31 in which is disposed a rod 32 for coöperation with the teeth 33 and 34 of the lever 35, which lever passes through the aforesaid slot 31 with its lower end bifurcated as at 36 for the reception therebetween of the inner ends of the adjusting arms 37 and 38, each of which has its outer end provided with eyes 39 and 40 for engagement with the rear end of the tubular members 14 and 15 of the frame for operation in a manner to be presently explained. It will be observed that the inner ends of said adjusting arms 37 and 38 are each provided with a series of perforations $e$ to permit of an adjustable connection of the inner ends of said arms with the lower end of said lever 35.

In order to hold the frame in proper position with respect to the axle and its ground wheels, I provide a pair of caster wheels 41 and 42, each having an upwardly directed spindle 43 and 44 for engagement in the alining eyes 45 and 46 of the upper and lower arms 47 and 48 of the brackets 49 and 50 which latter have their bight portions secured against the inner face of the flattened portion 24 of the frame by means of a suitable bracket 51, it being seen that the upper and lower arms 47 and 48 of each bracket 49 and 50 are disposed in planes above and below the forward end of the frame. Since the forward end of the frame is designed for adjustment vertically in a manner to be presently explained, it might be stated at this time, that the spindles 43 and 44 are provided each with upper and lower collars 52 and 53, the respective collars engaging upper and lower faces of the respective arms 47 and 48 and being adjustable upon the spindle by means of the set screws 54. By reason of these collars 52 and 53 and their adjustment upon the spindles 43 and 44, it is obvious that when the forward end of the frame is elevated, these collars may be so adjusted upon the spindles as to permit of the caster wheels engaging the ground at any elevation of the forward end of the frame.

Sleeves 55 and 56 are arranged upon the respective side members 14 and 15 of the frame with their inner ends disposed against the collars 57 and 58 held adjustably upon the said side members 14 and 15 by means of suitable set screws 59, the said collars being disposed adjacent the eyes 39 and 40 of the adjusting rods 37 and 38. The outer ends of these sleeves 55 and 56 are disposed against collars 60 and 61 secured upon the side members 14 and 15, thereby preventing longitudinal movement of the sleeves upon the side members of the frame. Fixedly secured upon the sleeves near their inner ends, are pinions 63 and 64 which are designed to mesh with the teeth 12 and 13 of the aforesaid cog wheels 10 and 11 disposed upon the axle 1. It will therefore be understood that the sleeves 55 and 56 are designed to rotate upon the side members 14 and 15 of the frame to permit of the rotation of the said pinions 63 and 64 by reason of their mesh with said teeth of the cog wheels 10 and 11, the cog wheels, as already stated, rotating with the axle 1.

The chopper arms 65 and 66 of the machine are of peculiar formation and are disposed each upon the corresponding sleeves 55 and 56. It will be seen that each arm 65 and 66 is formed with an eye 67 for engagement upon the corresponding sleeve. These eyes tightly engage the said sleeves although they may be so engaged therewith as to permit of a sliding movement of the eye 67 of the respective chopper arms, so that the chopper arms may be removed from engagement with the sleeves. In other words, by loosening the set screws 62 of the collars 60 and 61, the latter may be moved longitudinally along the side members 14 and 15 of the frame and beyond the elbow connections 19 and 20 and by disengaging the side members 14 and 15 from the elbows 19 and 20 these chopper arms may be readily removed from the frame. Each chopper arm has its opposite ends provided with the chopper blades 68 and 69. Since the sleeves 55 and 56 rotate and the chopper arms are rigidly secured thereto, it is obvious that the chopper arms rotate with the rotation of the said sleeves.

The draft tongue 70 of the machine is connected at its inner end to the cross piece 71 having its opposite ends bent in a plane parallel with the tongue and provided at their extremities with eyes 72 and 73 for engagement with the portions 21 and 22 of the main frame adjacent the inner ends of the flattened portions 23 and 24, there being suitable braces 74 and 75 connecting the tongue 70 and the bracket or cross-piece 71 in any suitable manner. Secured at one of its ends by means of a bolt 76 to the tongue 70 is a curved lever 77 the curved end 78 of which curves under the overlapping flattened portions 23 and 24 at the forward end of the frame and is directed upwardly with an eye 80 in its upper end for engagement between the spaced perforated ears 81 of the lever rod 82, the connection between the eye 80 of the curved lever 77 and the perforated ears 81 of the lever rod 82 being effected by means of a suitable pivot pin or bolt 83. The opposite or inner end of the lever rod 82 is pivoted by means of a pivot bolt 84 intermediate the ends of the lever 85 the lower end of which is pivoted by means of a pivot bolt 86 to the center beam 28. This lever 85 is provided with a spring-actuated dog 85' for engagement with the teeth 87 of the segmental rack 88 the opposite ends of which are secured in any suitable manner to one side face of the center beam 28. It will be noted that the segmental rack 88 is bent to form a shoulder 89 which limits the movement of the lever in one direction. This lever 85 is positioned along the beam 28 so as to be within easy reach of an operator who may sit upon the seat 89' which is supported by means of a suitable leg 90 at the rear end of the center beam 28 in the rear of the aforesaid slot 31 of the latter. By reason of the curved end 78 of the lever connection 77, a forward push or pull upon the lever 85 will cause said curved end 78 to bear against the under face of the overlapping flat portions 23 and 24 of the frame and result in an upward movement of the forward end frame, it being obvious that the tongue 70 will be held in its normal position by the draft elements. Now when the forward end of the frame is adjusted in this manner, it is obvious also that the caster wheels may also be adjusted so that they may bear against the ground. The adjustment of the caster wheels is provided for in a manner already stated.

It will now be understood that as the ground wheels rotate forwardly, the axle 1 is caused to rotate therewith causing the cog wheels 10 and 11, which being in mesh with the pinions 63 and 64 of the rotatable sleeves 55 and 56, compel the chopper blades and their arms to rotate with respect to the frame and thereby efficiently chop out the excessive beets. As there are times when it is desired to chop deeper than at other times, is the reason why I provide mechanism for adjusting the frame of the machine, it being obvious that if the frame is adjusted, the choppers will enter the ground deeper or shallower according to the adjustment of the frame. As there are times also when it is expedient to narrow the machine for the accommodation of different widths of rows of plants to be spaced in their line, I provide the flattened overlapping ends 23 and 24 so that the forward end of the main frame of the machine may be narrowed to agree with the narrowed rear end of the frame, which latter end of the frame may be narrowed through the manipulation of the aforesaid lever 35. In other words, by disengaging the teeth 34 of the lever 35 from the pin 32 of the opening 31 of the beam 28 and forcing the lever 35 downwardly, the adjusting arms 37 and 38 at their inner ends will be consequently forced downwardly causing their eyes 38 and 40, which are engaged with the side members 14 and 15 of the frame to pull the latter inwardly toward each other along the axle 1, the inward adjustment of the inner ends of the side members 14 and 15 being made substantial by reason of the upper notch 33 of the lever 35 engaging the aforesaid pin 32 in the said slot or opening 31 of the beam 28. It will thus be seen that both adjusting levers for the front and rear of the machine are within ready reach of the operator seated upon the seat of the machine, and it will also be understood that when the inner ends of the side members 14 and 15 of the frame are forced toward each other, the cog wheels 10 and 11 are moved accordingly by manipulating the collars and thumb-screws $d$ and $c$ of the cog wheels.

By reason of the aforesaid clutch sleeves 2 and 8, of the axle and ground wheels respectively, it is obvious that upon backing the machine, the axle will rotate backwardly, but not operate the chopping mechanism.

What is claimed is:

A machine of the type set forth comprising an axle having ground wheels at its ends, a sectional frame connected with the axle and including side portions adapted for relative adjustment towards and away from one another, chopper elements mounted for rotation upon said respective side portions, gearing for rotating said elements, a central stationary beam having a slot and a pin transversely of said slot, a lever projected through said slot and formed with notches to engage said pin, and adjusting arms having connection with the lower end of said lever and with said side portions, whereby the latter will be moved toward or away from one another upon downward or upward movement of said lever.

In testimony whereof, I affix my signature, in presence of witnesses.

THORNTON A. ROBERTS.

Witnesses:
    JOHN J. HALLIGAN,
    E. M. SMITH,
    D. E. MORRILL.